United States Patent [19]
Park

[11] Patent Number: 5,418,623
[45] Date of Patent: May 23, 1995

[54] METHOD OF RECORDING AND REPRODUCING A VIDEO SIGNAL WITH IMRPOVED QUALITY DURING VARIABLE SPEED OPERATION

[75] Inventor: Ku M. Park, Seoul, Rep. of Korea

[73] Assignee: Samsung Electronics Co., Ltd., Japan

[21] Appl. No.: 225,003

[22] Filed: Apr. 7, 1994

Related U.S. Application Data

[63] Continuation of Ser. No. 886,194, May 21, 1992, abandoned.

[30] Foreign Application Priority Data

Oct. 18, 1991 [KR] Rep. of Korea ............... 9118434

[51] Int. Cl.⁶ .................................... H04N 5/76
[52] U.S. Cl. ............................ 358/335; 358/312; 360/10.1
[58] Field of Search ............ 358/313, 312, 310, 335, 358/311; 360/11.1, 10.1, 10.2, 35.1; H04N 9/79, 5/76

[56] References Cited

U.S. PATENT DOCUMENTS

| | | | |
|---|---|---|---|
| 4,451,857 | 5/1984 | Mikado | 358/312 |
| 4,686,584 | 8/1987 | Kojima et al. | 360/10.3 |
| 4,760,471 | 7/1988 | Brush et al. | 360/10.2 |
| 4,910,605 | 3/1990 | Sasaki et al. | 358/310 |

*Primary Examiner*—Tommy P. Chin
*Assistant Examiner*—Robert Chevalier
*Attorney, Agent, or Firm*—Sughrue, Mion, Zinn, Macpeak & Seas

[57] ABSTRACT

A method for recording and reproducing video data of a digital video cassette recorder (VCR), wherein the method of recording encoded video data onto a magnetic tape records video data of a field after distributing and arranging the data in order, corresponding to a transit orbit of a rotary head when reproducing at a variable speed, thereby providing a picture having a good quality when reproduced at the variable speed, equal to that when reproducing at normal speed.

12 Claims, 2 Drawing Sheets

| 1p | 2p | 3p | 4p |
|----|----|----|----|
| 1k | 2k | 3k | 4k |
| 1f | 2f | 3f | 4f |
| 1a | 2a | 3a | 4a |

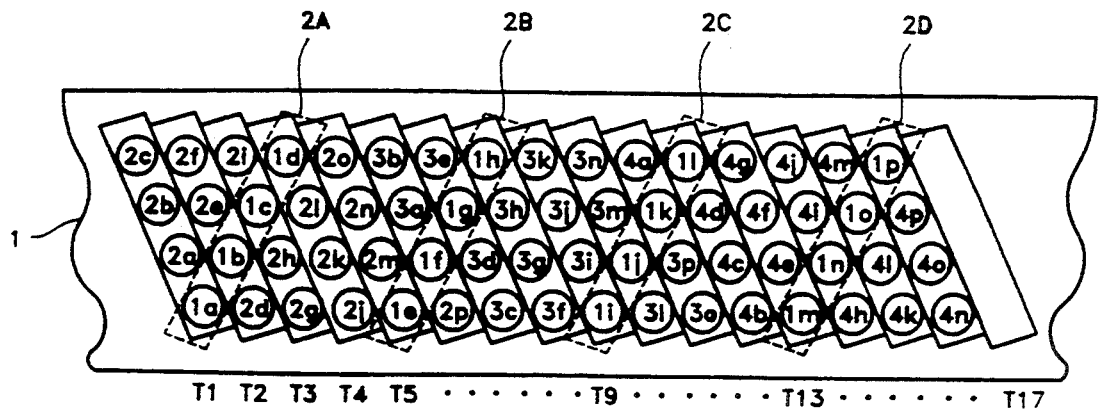

METHOD OF RECORDING AND REPRODUCING A VIDEO SIGNAL WITH IMRPOVED QUALITY DURING VARIABLE SPEED OPERATION

This is a Continuation of application Ser. No. 07/886,194 filed May 21, 1992, abandoned.

BACKGROUND OF THE INVENTION

The present invention relates to a method of recording and reproducing video data signals, and more particularly to a method of recording and reproducing video data signals in order to improve the quality of a reproduced picture during operation of a digital video cassette recorder (VCR) at a variable speed, such as during a fast-forward, still-frame, or slow-motion operation.

Examples of recording and reproducing techniques for digital VCR are found in the following articles, which are incorporated herein, by reference:

"A Study on Trick Plays for Digital VCR," by Yamamitsu et al., THPM 13.2, pp 184–185, IEEE 1991.

"An Experimental Study for a Home-Use Digital VTR," by Yamamitsu et al., IEEE Transactions on Consumer Electronics, Vol. 35, No. 3, Aug. 1989.

"Rate-Constrained Optimal Block-Adaptive Coding for Digital Tape Recording of HDTV," by Wu and Gersho, IEEE Transactions on Circuits & Systems for Video Technology, Vol. 1, No. 1, March 1991 (pp 100–101).

"Adaptive DCT Coding for Home Digital VTR," by Dol et al., GLOBECOM 1988, pp. 1073–1079.

Because the amount of data in a digitized video signal is massive, the conventional digital video cassette recording/reproducing apparatus (VCR) transforms the image data using a discrete cosine transformation (DCT), which is a type of orthogonal transformation. In order to compress an amount of data, the digital VCR quantizes a DCT coefficient, encodes the quantized coefficient representing the DCT coefficient value by a variable length coding scheme such as a Huffman code, and records the encoded video data on a magnetic tape. Also, the digital VCR reproduces the original image signal by reversing the recording process. Video data representing a single field is recorded onto plural tracks of the magnetic tape through rotary heads when recording the data. To record video signals with high definition by a rotary head-type VCR mechanism designed to record a National Television System Committee (NTSC) standard television signal, the relative velocity of the rotary head to the tape is high. Therefore, a segment recording method is used which distributes and records video signals representing a single field onto a plurality of tracks. Accordingly, it is desirable that on each track there is recorded a constant amount of data corresponding to a fixed portion of the size of the picture. However, since a variable length coding scheme is adopted as described above, it is difficult to fix a constant amount of data assigned to each track to be proportional to a fixed portion of the size of the picture. As a result, when a reproducing head crosses tracks, as when a rapid tape speed is required, it is difficult to obtain the desired picture from data read during the crossing track reproduction operation.

As shown in FIG. 1, a conventional recording format uses a segment recording method having four tracks per field, wherein a head traversely crosses four tracks during a single scan in reproducing at a four-fold speed. Thus, a single track includes data 1a, 1b, 1c, and 1d, constituting one fourth of a field and occurs on the tape as recorded and/or reproduced at normal speeds. At a fast speed of 4 times normal, the reproducing head will cross into four tracks on a single scan, reading data 1a, 1f, 1k and 1p. The video data corresponding to one field is reproduced as shown in FIG. 2, wherein sixteen tracks are scanned four times. Therefore, the image data of a field reproduced at a four-fold speed whose segments in each field are mixed, differs from the image data of a field when reproducing at a normal speed. Moreover, when the coding lengths per track are different for each field, the picture quality reproduced at a variable speed is further deteriorated.

SUMMARY OF THE INVENTION

In order to overcome the above problems of the prior art, it is an object of the present invention to provide a method of recording video data capable of reproducing a picture at a variable speed having quality as good as that during a normal speed mode.

To accomplish the above and other objects, a recording method of the present invention comprises the steps of recording video data of one picture in respective regions of M×N tracks, wherein the respective regions correspond to M scanning traces of a magnetic head which traverses N tracks by scanning M times, and recording video data of other pictures onto the remaining regions of the M×N tracks for reproducing at an N-fold speed.

To accomplish the above and other objects, the method of reproducing video data further comprises the steps of, when reproducing at a normal speed, picking up data recorded on the magnetic tape by sequentially scanning the M×N tracks, writing the picked up data into N field memories, reading out the video data of a field corresponding to the respective regions among the video data written in the N memories, and sequentially reading out video data of the other fields corresponding to the remaining regions by a unit according to the order of the other regions. When reproducing at the N-fold speed, the method comprises the steps of picking up data recorded on the magnetic tape by scanning the respective regions of M×N tracks, writing the data picked up in one field memory, and reading out video data of the one field memory.

BRIEF DESCRIPTION OF THE DRAWINGS

The above objects and other advantages of the present invention will become more apparent by describing the preferred embodiment with reference to the attached drawings, in which:

FIG. 3 represents an embodiment of a recording format in a rotary head type digital VCR according to the present invention;

FIG. 4 illustrates the structure of a reproduced picture when reproducing a video signal at a four-fold speed using the recording format shown in FIG. 3; and FIG. 5 illustrates the structure of a reproduced picture when normally reproducing using the recording format shown in FIG. 3.

DETAILED DESCRIPTION OF THE PREFERRED EMBODIMENT

Figures 1, 2:
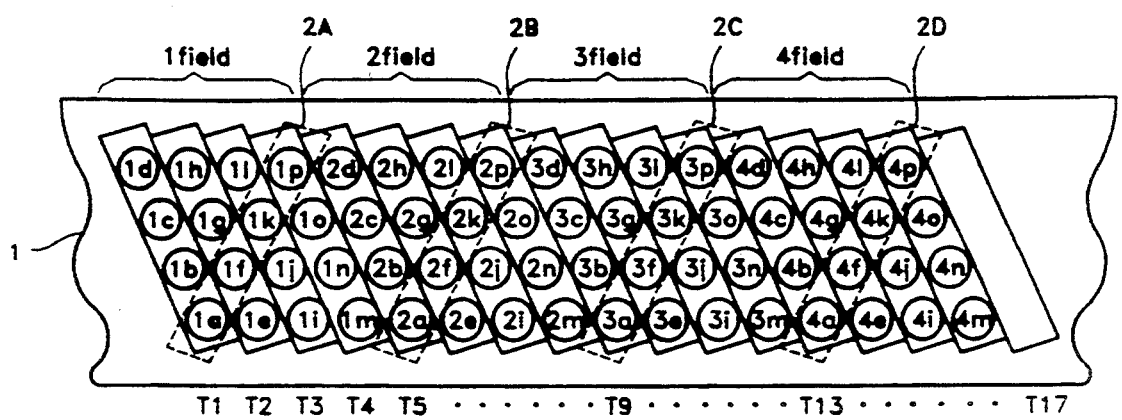
FIG. 1 represents recording formats in a conventional rotary-head digital video cassette recorder (hereinafter referred to as a "VCR")
FIG. 2 illustrates the transit orbit of a head when reproducing at a variable speed using a conventional rotary-head digital VCR.

FIG. 3 shows an embodiment of the present invention using a recording format of a rotary-head digital VCR. In the figure, reference number 1 represents a magnetic tape, reference numbers 2A-2D indicate scanning traces that represent transit orbits of the head at a four-fold speed, and reference numbers T1-T17 represent the tracks of the tape. In order to more easily understand the present invention, each code on the tracks should be taken as any code representing video data for its respective field. Also, it will be apparent that the recording format consists of four tracks per field.

Referring to FIG. 3, video data 1a, 1b, 1c, ... 1p, representing the entire data of the first field of a four field group of data are distributed and arranged in order at different positions of each track corresponding to transit orbits of the head at a four-fold speed. Due to the particular arrangement, during reproducing at the four fold speed, the result of four fast scans will reproduce all the data from the recorded first frame; i.e., the data 1a, 1b, 1c, ... 1p will be reproduced in order. Thus, the fast scan produces the same full frame as would be produced by a normal scan in a conventional digital VCR system. The video data 2a-2p, 3a-3p and 4a-4p for the remaining second, third and fourth fields, respectively, are sequentially arranged on respective tracks in positions, not already taken by data of the first field (1a-1p). Although the preferred embodiment of the present invention is described as a method having two segments and four tracks per field, other configurations, such as a method having L segments and N tracks per field are also possible. In addition, it should be noted that the video data could be arranged according to segments and tracks per frame rather than segments and tracks per field.

A recording format of the preferred embodiment is accomplished by performing the steps of distributing and arranging video data according to a unit of four fields as shown in FIG. 3, and recording the video data distributed and arranged in order onto the corresponding tracks by a method of recording codes 1a, 2a, 2b, and 2c on track T1 through a rotary head.

The recording format described can easily be accomplished using known digital VCR recording apparatus plus four field memories and conventional logic circuitry or ROM controlled program sequencing for reading out the data from the four field memories in the sequence shown in FIG. 3; i.e., 1a, 2a, 2b, 2c, 2d, 1b, 2e, ..., 4o, 4p, 1p. Basically, the first field is distributed among the following three fields so that the recorded positions of the data representing the first field will be coincident with the N fold speed scan of the reproducing heads to thereby produce a true field of data during the N fold rapid scan.

The number of fields in a group is four in the particular embodiment shown. However, the number in general will be the same as the number (M) of tracks per field. The total number of tracks over which the field data is distributed becomes M×N, where the rate of the rapid scan is N times normal.

Video data of the first field on the head's transit orbits 2A-2D, represented by dotted lines in FIG. 3, are reproduced as shown in FIG. 4 when reproducing at a four-fold speed. When reproducing at a normal speed, video data is reproduced starting from track T1. Video data reproduced when a head is scanning at least up to track T17, is restored into the original data of each field via a reorganizing process in memory, as shown in FIG. 5. The restored video data is read out starting from the video data of the first field. Herein, the restoring process restores data according to a write address designation when writing the data in memory. Meanwhile, when reading out video data once written in memory, the data is restored according to a readout address designation.

More specifically, the apparatus and method for reading out the data stored according to the format of FIG. 3 at normal scanning rates, so as to provide the data in the proper sequence of FIG. 5 for video display, uses standard digital VCR apparatus together with an N field memory and conventional logic or programming control of a read out sequence. In a manner which is the converse of the write-to-tape operation described above, the data read during a normal speed scan is entered into the four field memory in sequence. Thereafter, the data is read out in the normal sequence of 1a, 1b, 1c, 1d, 1e, ... 4m, 4n, 4o, 4p.

As described above, the present invention arranges and records video data of a field onto a position corresponding to a transit orbit of a head for reproducing at a variable speed, thereby reproducing a picture at a variable speed which has a picture quality equal to that of reproducing at normal speed. Also, the present invention has an advantage in that recording the distributed and arranged video data in this manner reduces burst errors.

The present invention as described above sets forth a recording format corresponding to reproduction at a variable speed. The invention, however, is not limited to the above described embodiment. The object of the invention can be accomplished by recording video data of a field onto a position of a transit orbit of the head, which corresponds to a particular reproduction such as a still-frame or a slow-motion operation, and by reproducing the data corresponding to the recording process.

What is claimed is:

1. In a digital video tape recorder having a normal speed recording mode, a normal speed reproducing mode, and a fast speed reproducing mode which operates at N times normal reproducing scan rate, a method comprising the steps of:

reformatting video data representing a group of consecutive video fields by distributing data representing one of said fields among sequentially positioned data representing remaining ones of said fields so that a complete scan of only data representing said one field occurs during said fast speed reproducing mode which scans a portion of a tape where said group of consecutive video fields are recorded, and recording said video data during the normal speed recording mode in an arrangement corresponding to said reformatting step.

2. The method according to claim 1 further comprising:

scanning said recorded video data representing said group of consecutive fields at said fast speed whereby a trace of recording/reproducing heads across said tape traverses N recorded tracks per trace and picks up only video data representing said one field, wherein N is an integer greater than 1.

3. The method according to claim 2 further comprising:

scanning said recorded video data representing said group of consecutive fields at said normal speed and reproducing electrical signals representing the video data recorded on said tape in the sequence recorded, and deformatting said reproduced video data into a proper field sequence by extracting distributed video data representing said one field and arranging it into a single field.

4. The method according to claim 3 wherein said video data is recorded on said tape at normal speeds in a format of M tracks per field, and said video data of said one field is distributed over N×M tracks, wherein M is an integer greater than 1.

5. The method according to claim 3 wherein said video data is data which has been subjected to a Discrete cosine Transformation and Variable Length Coding compression.

6. A method of recording consecutive video data representing a complete field on M tracks of a magnetic tape by scanning M times, the method comprising the steps of:

recording consecutive video data representing one complete field in respective regions interspersed throughout M×N tracks, said respective regions corresponding to M scanning traces of a magnetic head, each of which traces traverses N tracks, by scanning M times, during reproduction of the video data at an N-fold speed; and recording consecutive video data representing other complete fields in remaining regions of said M×N tracks, wherein M and N are each integers, and wherein M is greater than 1.

7. The method of recording video data as claimed in claim 6, wherein said video data is orthogonal-transformation compression coding data.

8. The method of recording video data as claimed in claim 6, wherein said video data represents a picture and consists of a field.

9. The method of recording video data as claimed in claim 6, wherein said video data represents a picture and consists of a frame.

10. A method of reproducing video data recorded in such a manner that the video data of one field is arranged in respective regions of M×N tracks of a magnetic tape, said respective regions corresponding to M scanning traces of a magnetic head, each of which traces traverses N tracks, by scanning M times in an N-fold speed playback mode, the video data of other fields are arranged in remaining regions of the M×N tracks, the method comprising the steps of:

picking up data recorded on the magnetic tape by sequentially scanning said M×N tracks, writing said picked up data in N field memories, reading out video data of said one field corresponding to said respective regions among video data written in said N memories, and sequentially reading out the video data of the other fields corresponding to said remaining regions to a unit according to an order of the other fields, when reproducing during the N-fold speed playback mode.

11. The method of reproducing video data as claimed in claim 10, wherein the reproduced, distributed and arranged video data is restored into an original position of each field according to a write address designation, during said step of writing the data in said memories.

12. The method of reproducing video data as claimed in claim 10, wherein the written video data is restored into an original position of each field according to a readout address designation, during said step of reading out said memories.

* * * * *